United States Patent Office 3,377,383
Patented Apr. 9, 1968

3,377,383
METHOD OF PREPARING N,N-BIS-(3-AMINO-PROPYL)-ETHANOLAMINE
Adalbert Farkas, Media, Pa., and Frank Miller, Wilmington, Del., assignors to Air Products Chemicals, Inc., a corporation of Delaware
No Drawing. Filed Aug. 30, 1961, Ser. No. 134,835
3 Claims. (Cl. 260—584)

The present invention is directed to the synthesis of N,N-bis-(3-aminopropyl)-ethanolamine, a new hydroxyalkylpolyamine.

Certain hydroxyalkyl alkylene polyamines have become of considerable importance as cross-linking agents in the curing of epoxy resins, as polymerizing agents for polyurethanes, in the synthesis of more complex heterocyclic nitrogen compounds, as basic extractants for the removal of acidic impurities in gases and the like. The preparation of new and effective hydroxyalkyl polyamines is accordingly of substantial commercial interest.

An object of the present invention is the synthesis of N,N-bis-(3-aminopropyl)-ethanolamine. Another object is the synthesis of this diamine by the direct catalytic reduction of the corresponding dinitrile. Yet another object is the synthesis of the desired amine by reduction of the dinitrile under conditions which minimize the decomposition of the charge stock and the product.

These objects are attained by effecting the reduction of N,N-di-(2-cyanoethyl)-ethanolamine with an active hydrogenation catalyst under specially selected conditions as hereinafter set forth.

In accordance with the invention, N,N-bis-(3-aminopropyl)-ethanolamine is produced by the reduction of N,N-di-(2-cyanoethyl)-ethanolamine by contact with an active hydrogenation catalyst in the presence of hydrogen and ammonia at temperatures in the range of 30 to 80° C. and preferably in the range of 40° to 50° C. or more desirably 45 to 50° C. and at pressures in the range of about 1000 to about 5000 pounds per square inch gauge (p.s.i.g.). The di-(2-cyano-ethyl)-ethanolamine, which is liquid at ordinary temperatures is dissolved in an inert solvent. This solution is treated with hydrogen in an amount at least equal to the chemical requirement for reduction. An active hydrogenation catalyst such as Raney nickel is employed while maintaining a sufficient amount of ammonia in the system to suppress the formation of excessive quantities of by-products. The temperature is controlled to be above 30° C., thereby avoiding conditions at which no appreciable amount of reaction takes place, and below 80° C., thereby avoiding conditions at which decomposition of the dinitrile charge stock or the amine product is excessive.

By carrying out the reaction with an active hydrogenation catalyst in the presence of both hydrogen and ammonia and at a low temperature, decomposition of the dinitrile charge stock to ethanolamine and acrylonitrile or its polymers is minimized. At the same time side reactons of the amine formed are inhibted, so that a substantial yield of N,N-bis-(3-aminopropyl)-ethanolamine is obtained.

As stated above the pressure range is in the order of about 1000 to about 5000 p.s.i.g. While pressure in the higher range, e.g., 2200 to 5000 p.s.i.g., can be used and may be advantageous, the reaction is generally effected under more moderate pressure such as in the order of 1000 to 2200 p.s.i.g. A substantial portion of the pressure effect is contributed by hydrogen which may be pure hydrogen or gases high in hydrogen content, such as the off-gas from ammonia synthesis, hydrocarbon reforming operations or the like.

The use of ammonia together with hydrogen in the reaction is an important factor in the process. The amount of hydrogen employed should preferably be at least 2 moles of hydrogen per nitrile group reduced, or 4 moles of hydrogen per dinitrile molecule, as in the following equation:

1. 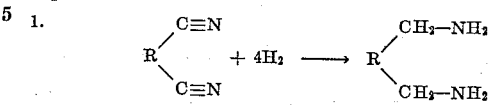

where R is the rest of the dinitrile molecule.

The presence of ammonia is important to the process, to serve as an inhibitor against secondary amine formation, for example, by the side reaction mechanism illustrated below, in which ammonia is formed.

2. 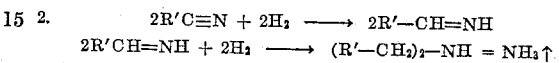

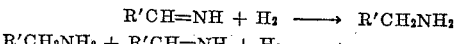
or
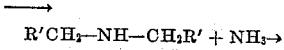

where R' is the rest of the nitrile molecule.

The invention is further clarified in the following examples.

EXAMPLE I

A stainless steel pressure vessel of 450 ml. capacity was partially filled with 76 grams (0.46 mole) of di-(2-cyanoethyl)-ethanolamine, $$HO-CH_2-CH_2-N-(CH_2CH_2CN)_2$$

16 grams of freshly prepared Raney nickel catalyst, 100 ml. of absolute ethanol and 50 ml. of liquid ammonia. The pressure vessel was equipped with a thermocouple for the measurement of temperatures. Hydrogen was added to the sealed vessel until the pressure was at 2100 p.s.i.g. At a temperature of 29.5° C. with mechanical shaking, there was a pressure drop of 300 p.s.i. (to 1800 p.s.i.g.) in about 2 hours, indicating only a very slight reaction. The temperature was raised to 49° C., at which temperature the pressure dropped 240 pounds in ¾ hour to a gauge pressure of 1560 pounds. The reactor pressure was then increased to 2080 pounds by introducing additional hydrogen. After being shaken for an additional 18 hours at 49° C. the final pressure was 810 pounds. The heat was then turned off and the shaking was stopped. There was a total pressure drop from the start of the hydrogenation of 1820 pounds, of which 1510 p.s.i.g. was at 48–50° C.

The reaction mixture was removed from the pressure vessel and the vessel rinsed with absolute ethanol. Nickel catalyst was removed from the reaction mixture by filtration and the alcohol was separated from the solution by evaporation under vacuum in a rotary evaporator. The liquid product was subjected to vacuum distillation, with the fraction boiling at 142–154° C. at 2.3 to 2.5 mm. of mercury being separated and collected. The amount of product thus recovered weighed 43.4 grams, equivalent to 54% of theoretical yield.

The reaction product was analyzed to establish its molecular structure. Ultimate analysis showed:

Theory [1]: C, 54.9%; H, 12.10%; N, 24.0%. Found: C, 54.53%; H, 11.86%; N, 23.10%.

The (tri)-picrate derivative was prepared and found to have a melting point of 233–238° C. Ultimate analysis of the picrate showed:

Theory [2]: C, 36.20%; H, 3.51%; N, 19.49%. Found: C, 36.28%; H, 3.21%; N, 19.18%.

---
[1] For N,N-bis-(3-aminopropyl)-ethanolamine.
[2] For C₈H₂₁ON₃·3C₆H₃O₇N₃.

which confirmed the empirical composition of the amine product as $C_8H_{21}ON_3$.

The amine product

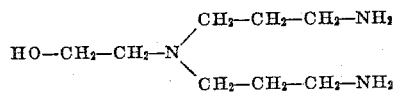

had a molecular weight of 175.

An electrometric titration of the product showed three distinct basic functions with two similar (primary) amines being more basic and one dissimilar (tertiary) amine being less basic:

$pK_1 = 10.65$ ⎫ 2 primary amines closely similar
$pK_2 = 9.45$ ⎭ in basicity.
$pK_3 = 6.45$ — 1 tertiary amine, less basic.

The final end point for the amine was at 3.7 pH and required 8.20 ml. of 2.049 N.HCl for 0.9713 g. of sample, which corresponds with a trifunctional base of 173.4 g./mole having a neutralization equivalent of 57.8 g. which is in accord with neutralization equivalent of N,N-bis-(3-aminopropyl)-ethanolamine (58.3 g.).

In Example I above, the available hydrogen was in the ratio of 4 mols/mol of dinitrile, i.e., sufficient to satisfy the stoichiometric requirement for reduction of two nitrile groups to primary amines, assuming all the dinitrile was reduced. However, since the product yield was less than theoretical, it is evident that some fraction of the available hydrogen was unused and constituted an average over that required for nitrile reduction. At the same time the ammonia present was in the ratio of 4.5 mols/mol of dinitrile. In all, substantial amounts of unreacted hydrogen and ammonia were present in the system. While moderate variations from the above ratios of unreacted gases may be used, it is preferred that (1) not less than the stoichiometric amount of hydrogen, nor more than about 8 mols $H_2$/mol of charge, be used and (2) not less than about 2 mols $NH_3$/mol of charge and generally not more than about 5 mols $NH_3$/mol of charge be used.

The upper limits on these unconsumed components are not strictly defined since the ratio of non-reactants to reactants that can be tolerated in the system is largely determined by process economics. The higher the ratio of non-reactants, the lower the rate of liquid throughput and the higher the process costs due to the extended separation and recycle requirements.

The catalyst used in Example I was freshly prepared Raney nickel. While the catalyst must be very active to bring about reduction of the dinitrile at about 45–50° C., it is not necessarily limited to Raney nickel or to Raney nickel and hydrogen. Effective reduction of nitriles to primary amines is obtainable by means of hydrazine hydrate acting as the reducing agent in the presence of Raney nickel. Other highly active hydrogenation catalysts may serve with like or differing success. For example, finely divided platinum or palladium distributed on active carbon has been found active in the reduction of nitriles to primary amines at ambient temperatures in the presence of acetic anhydride as a solvent.

The process of reducing N,N-di-(2-cyanoethyl)-ethanolamine to N,N-bis-(3-aminopropyl)-ethanolamine has been described as a batch operation effected in a pressure vessel agitated by shaking. However, other means of effecting satisfactory contact between hydrogen and dinitrile in the presence of the catalyst and ammonia will produce the desired result. For example, a continuous flow reactor may be used with suspended or fixed bed solid catalyst operating at the proper temperature, pressure and flow rate to effect the desired reduction. Similarly, a series of pressure vessels could be used in either batch or continuous flow operation.

Hydroxyalkyl-alkylene polyamines of the type formed according to the invention are highly active cross-linking agents effective in curing epoxy resins. The polyfunctional amine of the invention has 5 replaceable hydrogen atoms available for cross-linking, four attached to nitrogen and one attached to oxygen; a tertiary amino group which catalyzes polymerization; and a hydroxyalkyl group which activates amino compounds in epoxy curing. The hydroxyalkyl component makes this amine notably less toxic and irritating than the corresponding non-hydroxyalkylated amines.

With a molecular weight of 175 and 5 equivalents per mole, 35 g. will supply one hydrogen equivalent reactive with one epoxy equivalent, or for an epoxy resin of 400 molecular weight having two epoxy equivalents per mole, 17 to 18 parts of the N,N-bis-(3-aminopropyl)-ethanolamine will supply the cross-linking agent in the stoichiometric amount required for 100 parts of epoxy resin. Use of the indicated stoichiometric amount of the N,N-bis-(3-aminopropyl)-ethanolamine results in rapid autogenic curing and nearly optimum physical properties in the cured resin.

EXAMPLE II 18 parts of N,N-bis-(3-aminopropyl)-ethanolamine, when mixed with 100 parts of Shell Epon resin type X-200, begins to react immediately on mixing. In less than 20 minutes the entire mix is gelled and, after standing 24 hours at room temperature, is a hard cured resin. A sample of this autogenically cured polymer, after further stabilization by oven curing 8 hours at 100° C., is resistant to distortion [3] under 260 pounds pressure to a temperature of 115–120° C.

EXAMPLE III

Natural gas containing minor amounts of acidic impurities including $H_2S$ and $CO_2$ is purified by extraction of the acidic impurities with N,N-bis-(3-aminopropyl)-ethanolamine. In such processing the gas under moderate pressure flows upwardly through a purification tower which is filled with inert contact material, such as carbon Raschig rings, against a counter-current flow of an extraction solvent containing 15–20% N,N-bis-(3-aminopropyl)-ethanolamine, 60% ethylene glycol and 20–25% water. The flow rate is about 400 gallons per minute. The solution is introduced at a temperature of approximately 40° C., and the effluent extract solution is passed through a heat exchanger at approximately 120° C. and then a reboiler at about 140° C. to remove the carbon dioxide and hydrogen sulfide. The lean amine solvent may be fortified with fresh solvent as needed and recycled to the extraction unit. Sulfur may be recovered from the expelled $H_2S$ gas.

The compound N,N-bis-(3-aminopropyl)-ethanolamine is also useful (1) as a complexing agent for metals in metal recovery and in demineralizing boiler waters, (2) as a condensation catalyst in base-catalyzed reactions, (3) as a long chain polyamine for linear polymer formation with diacids in synthetic fiber (nylon) manufacture, (4) as a reactant with long chain fatty acids to produce textile, leather and fiber finishing agents, (5) as a reactant with alkylene oxides to give nonionic detergents and (6) as a stabilizing agent in electroplating baths, in liquid hydrocarbons, etc.

Obviously many modifications and variations of the invention as hereinbefore set forth may be made without departing from the spirit and scope thereof, and therefore only such limitations should be imposed as are indicated in the appended claims.

We claim:
1. The method of preparing N,N-bis-(3-aminopropyl) ethanolamine which comprises reacting di-(2-cyanoethyl) ethanolamine with hydrogen at temperature above 30° C. and below about 80° C. in the presence of (a) ammonia, (b) a hydrogenation catalyst, and (c) an inert solvent.
2. The method of claim 1 wherein, further, the temperature is below the dissociation temperature of both the dinitrile charge and the amine product.

---
[3] ASTM heat distortion test D-648-56.

3. The process according to claim 2 wherein the product of reduction is degassed at atmospheric pressure, filtered to remove suspended catalyst, freed of volatile solvent and distilled to recover essentially pure N,N-bis-(3-aminopropyl)-ethanolamine boiling in the range of 142–154° C. at 2.3 to 2.5 mm. Hg pressure.

References Cited

UNITED STATES PATENTS

| | | | |
|---|---|---|---|
| 2,363,466 | 11/1944 | Senkus | 260—584 |
| 2,755,304 | 7/1956 | Bersworth et al. | 260—584 |
| 3,040,099 | 6/1962 | Feuer | 260—584 |
| 2,864,775 | 12/1958 | Newey | 260—47 |
| 2,868,767 | 1/1959 | Cyba et al. | 260—47 |
| 2,901,461 | 8/1959 | Auerbach et al. | 260—47 |
| 2,166,150 | 7/1939 | Howk | 260—583 |
| 2,166,151 | 7/1939 | Howk | 260—583 |

OTHER REFERENCES

Whitmore et al.: "Journal American Chemical Society," vol. 66, pages 725–31 (1944).

Ingberman et al.: "Journal of Polymer Science," vol. 28, pages 470–71 (1958).

Wagner et al.: "Synthetic Organic Chemistry," page 659 (1953).

CHARLES B. PARKER, *Primary Examiner.*

H. N. BERSTEIN, *Examiner.*

A. LIEBERMAN, R. V. HINES, *Assistant Examiners.*